United States Patent
Yoon

(10) Patent No.: US 12,111,877 B2
(45) Date of Patent: Oct. 8, 2024

(54) SYSTEM AND METHOD FOR PROVIDING GRAPHICAL USER INTERFACE

(71) Applicants: Hyundai Motor Company, Seoul (KR); Kia Corporation, Seoul (KR)

(72) Inventor: Il Yong Yoon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/581,172

(22) Filed: Jan. 21, 2022

(65) Prior Publication Data

US 2023/0033816 A1 Feb. 2, 2023

(30) Foreign Application Priority Data

Jul. 21, 2021 (KR) .................. 10-2021-0096005

(51) Int. Cl.
*G06F 16/957* (2019.01)
*G06F 16/9538* (2019.01)
*G06F 16/955* (2019.01)
*G06F 16/958* (2019.01)

(52) U.S. Cl.
CPC ........ *G06F 16/9577* (2019.01); *G06F 16/958* (2019.01); *G06F 16/9538* (2019.01); *G06F 16/9558* (2019.01)

(58) Field of Classification Search
CPC .......................... G06F 16/9577; G06F 16/958
See application file for complete search history.

(56) References Cited

U.S. PATENT DOCUMENTS

| 9,135,292 B1* | 9/2015 | Tsun .................... G06F 16/2453 |
| 2015/0135087 A1* | 5/2015 | Verkasalo ............... G06F 16/95 715/745 |
| 2019/0179608 A1* | 6/2019 | Kothari ............... G06F 16/9535 |
| 2020/0273458 A1* | 8/2020 | Zhang ..................... G06F 3/167 |
| 2022/0124055 A1* | 4/2022 | Sharifi .................... G06F 3/167 |

FOREIGN PATENT DOCUMENTS

| JP | 6097231 B2 | 3/2017 |
| JP | 2020095308 A | 6/2020 |
| KR | 102079236 B1 | 4/2020 |

* cited by examiner

*Primary Examiner* — Asher D Kells
(74) *Attorney, Agent, or Firm* — SLATER MATSIL, LLP

(57) ABSTRACT

An embodiment method for providing a graphical user interface (GUI) includes transmitting object information in response to an interaction, transmitting content and template information based on the object information, combining the content with the template information to render a GUI screen, and displaying the rendered GUI screen on a display device.

12 Claims, 4 Drawing Sheets

SYSTEM AND METHOD FOR PROVIDING GRAPHICAL USER INTERFACE

CROSS-REFERENCE TO RELATED APPLICATIONS

This application claims the benefit of Korean Patent Application No. 10-2021-0096005, filed on Jul. 21, 2021, which application is hereby incorporated herein by reference.

TECHNICAL FIELD

The present disclosure relates to a system and a method for providing a graphical user interface (GUI).

BACKGROUND

A graphical user interface (GUI) has a form which defines an object and describes transitioned pages, played media, or the like together upon an interaction with the object in a property of the object. According to an example below described with a handheld device hypertext markup language (HTML), when a user clicks on an 'a.jpg' image where an image file, 'a.jpg' and information about a link to portal.com' are combined with each other, he or she moves to 'portal.com'. A GUI program (e.g., a web browser) of a user's personal computer (PC) interprets an HTML document to output the HTML document on a screen and takes charge of page transitions when the user clicks on the HTML document.

```
<!DOCTYPEhtml>
<html>
<body>
<a href="https://portal.com">
<img class="image" src="images/a.jpg"/>
</a>
</body>
</html>
```

In an existing technology, all objects capable of performing an interaction on a GUI screen, a user interface (UI) layout, and static resources are present as predefined pages. However, the existing technology reads information from a database (DB) to suit a situation upon runtime and actively generates only corresponding content as a newly defined page in a content area, while the UI layout and the static resources remain the same. However, in this case, it is possible to change the content, but the screen configuration and the static resources are not changed. Furthermore, because a GUI program takes charge of screen transition, it is difficult to transition a screen without a screen interaction in a situation where there are several input schemes, such as a voice input, other than a screen.

SUMMARY

Embodiments of the present disclosure can solve problems occurring in the prior art while advantages achieved by the prior art are maintained intact.

An embodiment of the present disclosure provides a system and a method for providing a graphical user interface (GUI) to dynamically change a screen configuration and static resources together with content using a template to suit a situation.

The technical problems that can be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a method for providing a graphical user interface (GUI) may include transmitting, by a front-end, object information interacting, upon an interaction, transmitting, by a back-end, content and template information based on the object information, combining, by the front-end, the content with the template information to render a GUI screen, and displaying, by the front-end, the rendered GUI screen on a display device.

The transmitting of the object information may include detecting, by the front-end, an interaction event.

The interaction event may be an event generated in response to a manipulation input of a user.

The interaction event may be a context signal generated by another external device.

The transmitting of the content and the template information may include determining, by the back-end, the content based on the object information, determining, by the back-end, the template information based on the content and context information, and transmitting, by the back-end, the content and the template information to the front-end.

The template information may include an index of a predetermined template.

The template information may include predefined screen configuration information.

The template information may include the same template information or other template information.

The transmitting of the content and the template information to the front-end may include transmitting the content and the template information using a web-based bidirectional communication technology.

According to another embodiment of the present disclosure, a system for providing a graphical user interface (GUI) may include a communication device and a front-end and a back-end interconnected by the communication device. The front-end may transmit object information interacting, upon an interaction. The back-end may transmit content and template information based on the object information. The front-end may combine the content with the template information to render a GUI screen and may display the rendered GUI screen on a display device.

The template information may include an index of a predetermined template.

The template information may include predefined screen configuration information.

The template information may include the same template information or other template information.

The back-end may determine the template information based on the object information and context information.

The communication device may be implemented with a web-based bidirectional communication technology.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
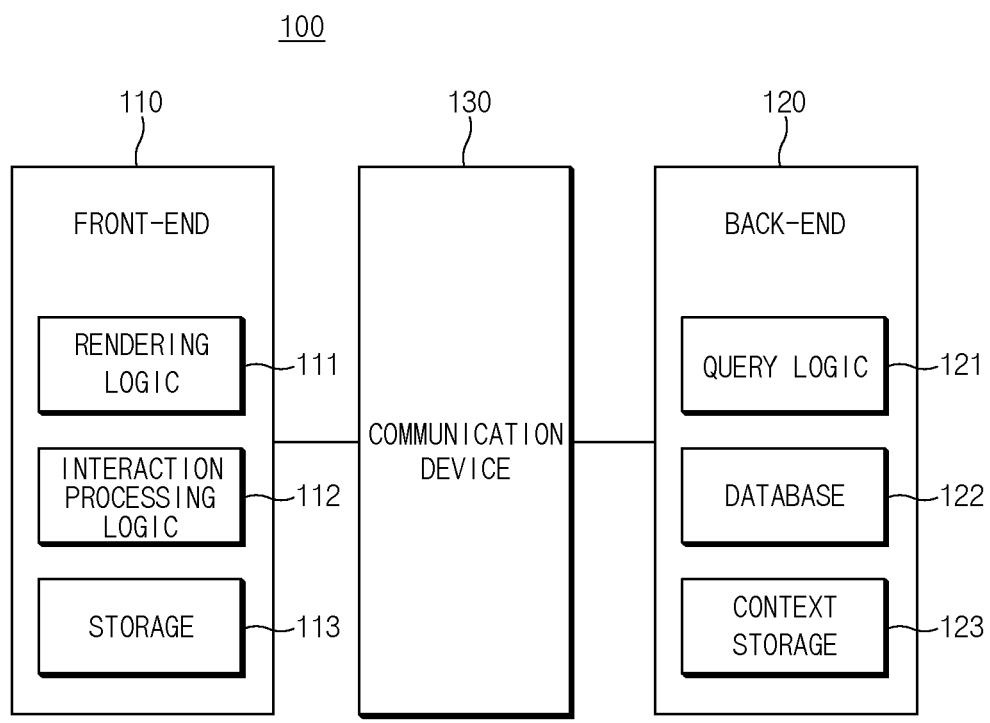
FIG. 1 is a block diagram illustrating a configuration of a system for providing a graphical user interface (GUI) according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
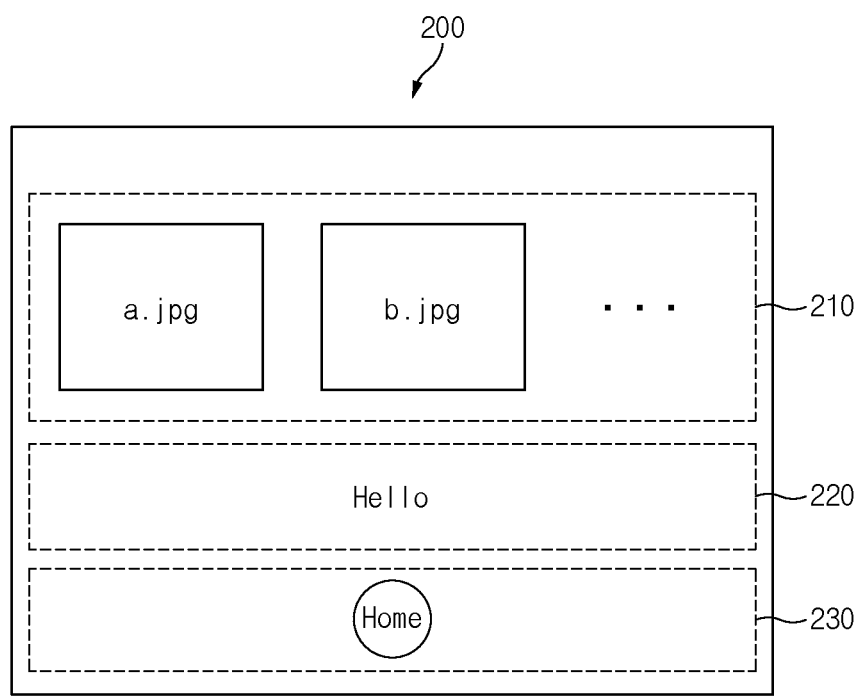
FIG. 2 is a drawing illustrating a GUI screen according to embodiments of the present disclosure.

FIG. 1 is a block diagram illustrating a configuration of a system for providing a graphical user interface (GUI) according to embodiments of the present disclosure. FIG. 2 is a drawing illustrating a GUI screen according to embodiments of the present disclosure.

A system 100 for providing a GUI may be a computing system including at least one processor, a non-transitory memory, an input device (e.g., a touch pad, a keyboard, a microphone, and/or the like), an output device (e.g., a display device, a touch screen, a speaker, and/or the like), and the like. The system 100 for providing the GUI may be applied to at least one of electronic devices such as a robot, a personal computer, a navigation terminal, an infotainment system, or a mobile station (e.g., a smartphone or the like). The system 100 for providing the GUI may include a front-end 110, a back-end 120, and a communication device 130. Each device 110, 120, or 130 may include at least one processor, a memory, and/or the like.

The front-end 110 may display a GUI on a screen (or a display screen) of a display device 200. The front-end 110 may be a GUI program, for example, a web browser, or the like. The front-end 110 may include rendering logic in, interaction processing logic 112, and storage 113. The rendering logic in and the interaction processing logic 112 may be executed by the processor.

The rendering logic in may render information displayed on the display screen. The rendering logic in may combine content with template information to render a GUI screen. The rendering logic in may render a screen depending on a condition and information by a JavaScript or the like without rendering only a static document. The rendering logic in may display the rendered GUI screen on the display device 200. Referring to FIG. 2, the display device 200 may output a GUI screen composed of a first area 210 on which an object (e.g., an image or the like) is displayed, a second area 220 on which text is displayed, and a third area 230 on which a static resource is displayed.

The interaction processing logic 112 may recognize and process an interaction with a user. The interaction processing logic 112 may detect (recognize) an interaction event upon the interaction with the user. The interaction event may be an event which occurs in response to various touch manipulation inputs of the user, for example, touching, dragging, flicking, swiping, pinching, and/or the like. Furthermore, the interaction event may be a context signal, for example, a battery warning signal, a wake-up word recognition signal, or the like, which is generated by another external device rather than the front-end 110.

When detecting the interaction event, the interaction processing logic 112 may recognize an interaction target object (an interaction object). The interaction processing logic 112 may transmit information about the recognized interaction object, that is, object information to the back-end 120 via the communication device 130. For example, the interaction processing logic 112 may transmit {Clicked_Images: "a.jpg" }, {Click: 'a.jpg'} or {Swipe: 'Screen'} or the like. The interaction processing logic 112 may transmit context information together when transmitting the object information. The context information may include information indicating whether any screen is displayed on the display device 200, information indicating whether any service is being provided, information indicating whether there is any interaction just before, information indicating whether the electronic device (e.g., a robot) is currently in any state, or the like.

The storage 113 may store at least one piece of template information in which a screen configuration (layout) and content placement are preset. The template information may be previously stored in the storage 113 or may be received when an initial page is loaded from the back-end 120. The template information may include an icon image, and may include the static content itself of media to be played or the like or may include a link to the static content. Furthermore, the storage 113 may store a static resource or the like. The storage 113 may be implemented as at least one of storage media (recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM).

The back-end 120 may include query logic 121, a database 122, and context storage 123. The query logic 121 may be executed by the processor. The query logic 121 may query for content stored in the database 122, context information stored in the context storage 123, and/or the like. The context storage 123 may store information about a task which is being performed, an interaction object, another input (e.g., a voice or the like), and/or the like. The context storage 123 may be implemented as at least one of storage media (or recording media) such as a flash memory, a hard disk, an SSD, an SD card, a RAM, an SRAM, a ROM, a PROM, an EEPROM, or an EPROM.

The back-end 120 may receive object information from the front-end 110. The back-end 120 may receive context information together with the object information. The back-end 120 may determine content to be displayed on the display screen based on the object information, the context information, and/or the like. The query logic 121 of the back-end 120 may query the database 122 for the determined content.

The back-end 120 may determine a screen configuration template based on the determined content, the context information, and/or the like. The back-end 120 may transmit content and/or template information (layout information) using the communication device 130. For example, the back-end 120 may transmit content and template information as shown below.

```
GUI_component:{
   template_number: 12,
   Images:[a.jpg,b.jpg],
   Text:"Hello"
}
```

The template information may include an index of a predetermined template. Furthermore, the template information may include predefined screen configuration (layout) information. The template information may be plaintext and may have a structured document format such as JavaScript object notation (JSON). Furthermore, the template information may include other template information as shown below.

```
GUI_component:{
   template_number: 12,
   Images:[a.jpg,b.jpg], Text:"Hello",
   GUI_component:{
   template_number: 10,
   Images:[c.jpg,d.jpg].
   Text:"Welcome"}
}
```

The above-mentioned embodiment describes the case where the other template information is included in the template information as an example, but it not limited thereto. The same information may be included in the template information.

Context information may be stored in the context storage 123. The context information may be received from the front-end 110 or may be internally obtained by the back-end 120. The context information may include previous interaction information, a test which is being currently performed, previously transmitted content, template information, and the like. Information about an object interacting, interaction information generated in another manner, for example, a voice, and the like may be stored in order in the context storage 123.

The communication device 130 may assist in bidirectional communication, such that the front-end 110 and the back-end 120 may transmit and receive data (information) therebetween. Because the front-end 110 and the back-end 120 are connected to each other in a bidirectional communication scheme by the communication device 130, they may first deliver information at a time when they want to deliver the information. The communication device 130 may be implemented with a web-based bidirectional communication technology such as a web socket, a server-sent event (SSE), and/or a WebTransport. The communication device 130 may include communication circuitry, an antenna, a transceiver, and/or the like.

As shown in the above-mentioned embodiment, the front-end 110 and the back-end 120 may be implemented in the form of different modules in the same electronic device (e.g., a robot, a computer, or the like) or may belong to different electronic devices connected by a network.

Figure 3:
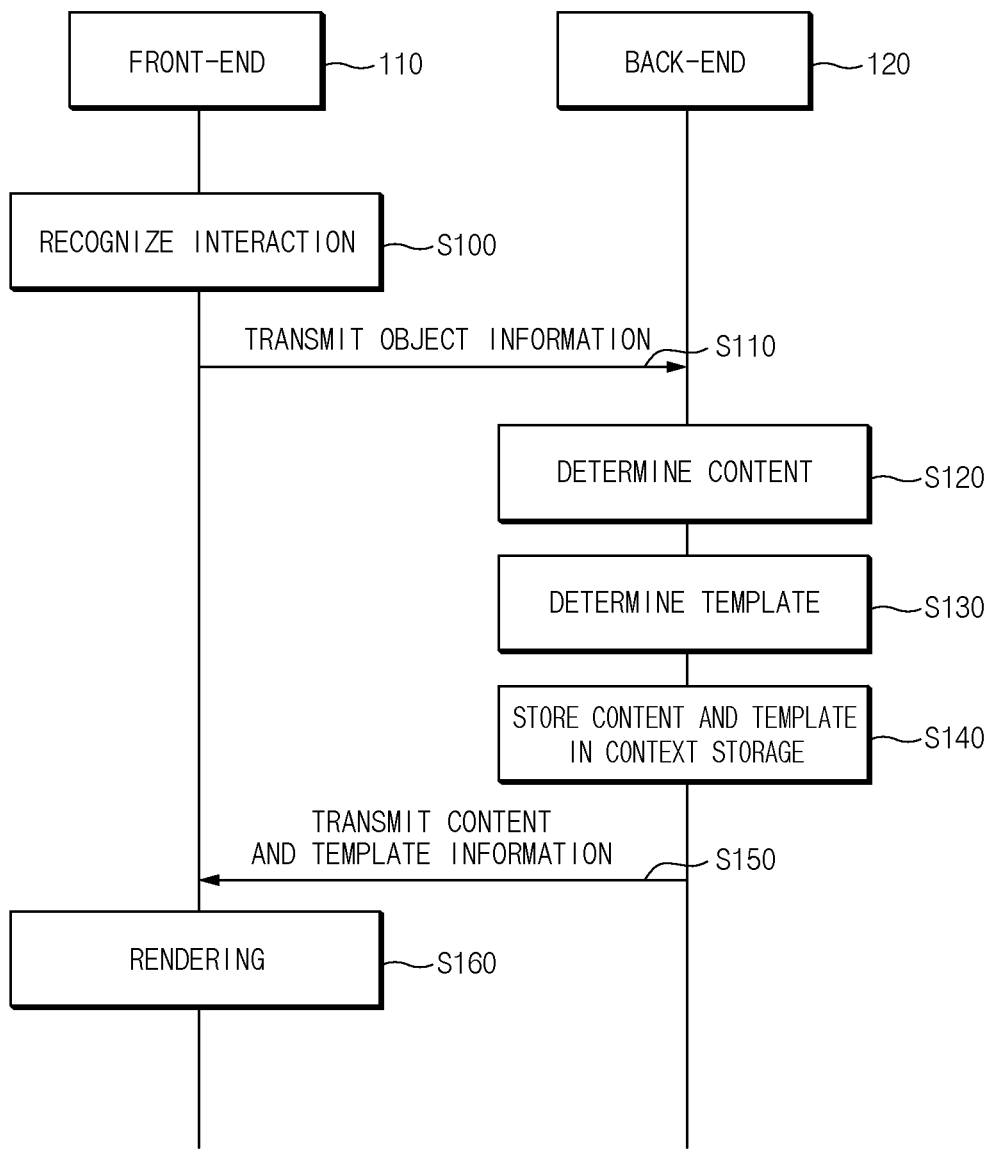
FIG. 3 is a signal sequence diagram illustrating a method for providing a GUI according to embodiments of the present disclosure.

FIG. 3 is a signal sequence diagram illustrating a method for providing a GUI according to embodiments of the present disclosure.

Referring to FIG. 3, in S100, the front-end 110 may recognize an interaction. The front-end 110 may recognize an interaction target object, that is, an interaction object upon the interaction.

In S110, the front-end 110 may transmit information about the interaction object, that is, object information to the back-end 120. When a user clicks on an 'a.jpg' image, the front-end 110 may transmit information about the clicked image (i.e., object), for example, {Click: 'a.jpg'}. Furthermore, when the user performs a swipe operation for the entire screen, the front-end 110 may transmit information about a predetermined object, for example, {Swipe: 'Screen'}. The front-end 110 may transmit context information together with the object information.

In S120, the back-end 120 may determine content based on the object information. The back-end 120 may determine content based on object information and/or context information and may query the database 122 of FIG. 1. The back-end 120 may internally obtain the context information.

In S130, the back-end 120 may determine a template based on the determined content. The back-end 120 may determine a template (layout) based on the determined content and/or the context information.

In S140, the back-end 120 may store the determined content and the template in the context storage 123 of FIG. 1. Whenever interaction information is changed, the back-end 120 may store content and template information associated with a corresponding interaction in the context storage 123. The back-end 120 may store an interaction, by another medium such as a voice rather than a screen, together. When a 'back' key is pressed and the object information is transmitted, the back-end 120 may fetch content and template information, which are transmitted just before, from the context storage 123 and may transmit the content and the template information to the front-end 110 to return to a corresponding screen.

In S150, the back-end 120 may transmit the content and the template information to the front-end 110. The back-end 120 may transmit the content and the template information to the front-end 110 using the communication device 130 of FIG. 1. For example, the back-end 120 may transmit the content and the template information (layout information) using a web-based bidirectional communication technology such as a web socket, a server-sent event (SSE), and/or a WebTransport.

In S160, the front-end 110 may combine the content with the template information to render a GUI screen. When receiving the content and the template information from the back-end 120, the front-end 110 may update information to a content area of the template and may render the screen. The front-end 110 may display the rendered screen on the display device 200 of FIG. 2.

Figure 4:
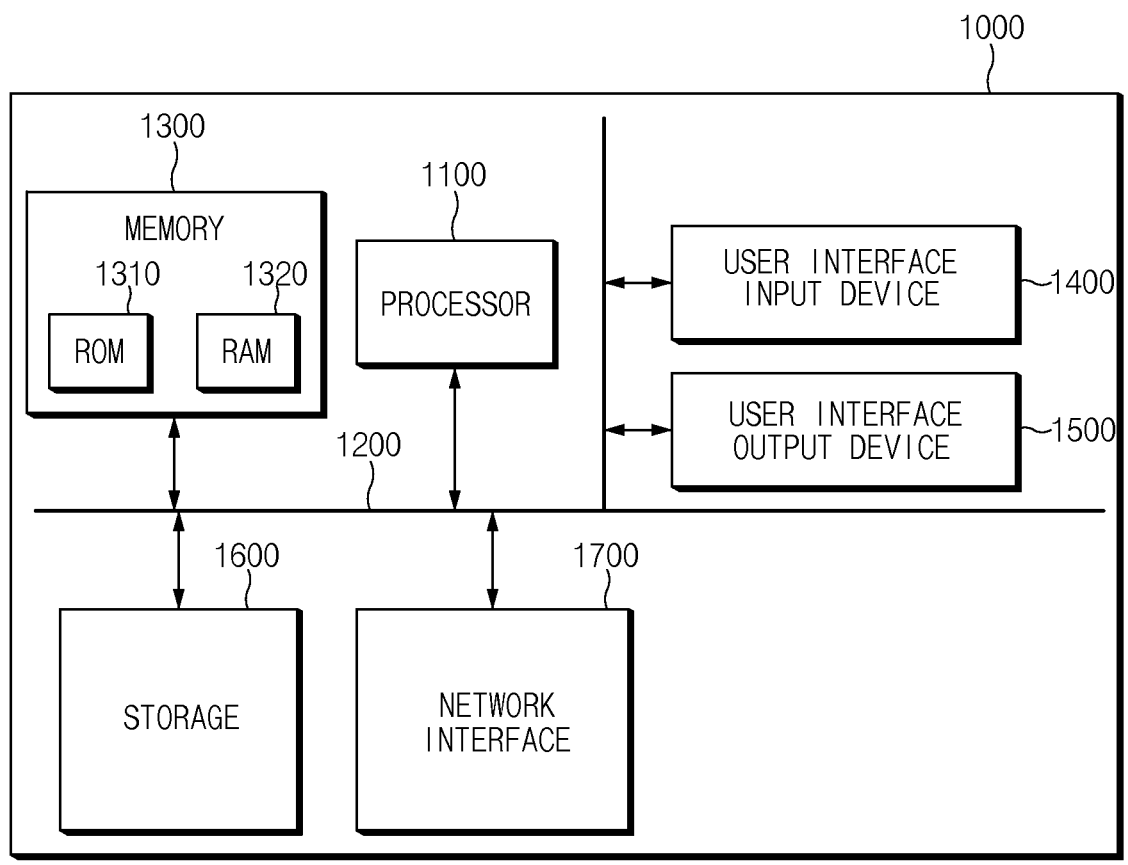
FIG. 4 is a block diagram illustrating a computing system for executing a method for providing a GUI according to embodiments of the present disclosure.

FIG. 4 is a block diagram illustrating a computing system for executing a method for providing a GUI according to embodiments of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the system for providing the GUI may separate content from a screen configuration to actively select a template to suit a situation, although there is the same content, and may change content depending on necessity although there is the same template.

Furthermore, according to embodiments of the present disclosure, when a definition of content and screen configuration is out of a code, a change in the content and the screen configuration may be immediately reflected without correcting the code.

Furthermore, according to embodiments of the present disclosure, the system for providing the GUI may transition a screen depending on a state of a computing system without an interaction with the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A method for providing a graphical user interface (GUI), the method comprising:
    transmitting, by a front-end, object information and context information in response to an interaction;
    determining, by a back-end, content based on at least the object information;
    determining, by the back-end, template information based on at least the determined content, wherein the template information comprises first screen configuration information corresponding to a first template number of a first GUI component; and second screen configuration information corresponding to a second template number of a second GUI component;
    transmitting, by the back-end, the content and the determined template information;
    combining, by the front-end, the content with the template information to render a GUI screen; and
    displaying, by the front-end, the rendered GUI screen on a display device.

2. The method of claim 1, wherein transmitting the object information comprises detecting, by the front-end, an interaction event.

3. The method of claim 2, wherein the interaction event is an event generated in response to a manipulation input of a user.

4. The method of claim 2, wherein the interaction event is a context signal generated by an external device.

5. The method of claim 1, wherein the transmitting of the content and the template information includes:
    transmitting, by the back-end, the content and the template information to the front-end.

6. The method of claim 5, wherein the template information includes an index of a predetermined template.

7. The method of claim 5, wherein transmitting the object information comprises detecting an interaction event by the front-end.

8. The method of claim 7, wherein the interaction event is an event generated in response to a manipulation input of a user.

9. The method of claim 7, wherein the interaction event is a context signal generated by an external device.

10. A system for providing a graphical user interface (GUI), the system comprising:
    a communication device; and
    a front-end and a back-end interconnected by the communication device, wherein the communication device, the front-end, and back-end are hardware components;
    wherein the front-end is configured to transmit object information and context information in response to an interaction;
    wherein the back-end is configured to:
        determine content based on at least the object information;
        determine template information based on at least the determined content, wherein the template information comprises first screen configuration information corresponding to a first template number of a first GUI component; and second screen configuration information corresponding to a second template number of a second GUI component; and
        transmit the content and the determined template information; and
    wherein the front-end is configured to combine the content with the template information to render a GUI screen and to display the rendered GUI screen on a display device.

11. The system of claim 10, wherein:
    the front-end is configured to detect an interaction event; and
    the interaction event is an event generated in response to a manipulation input of a user.

12. The system of claim 10, wherein:
    the front-end is configured to detect an interaction event; and
    the interaction event is a context signal generated by an external device.

* * * * *